Feb. 25, 1936.                B. E. HOUSE                2,032,058
                                BRAKE
                        Filed Nov. 13, 1933           2 Sheets-Sheet 1
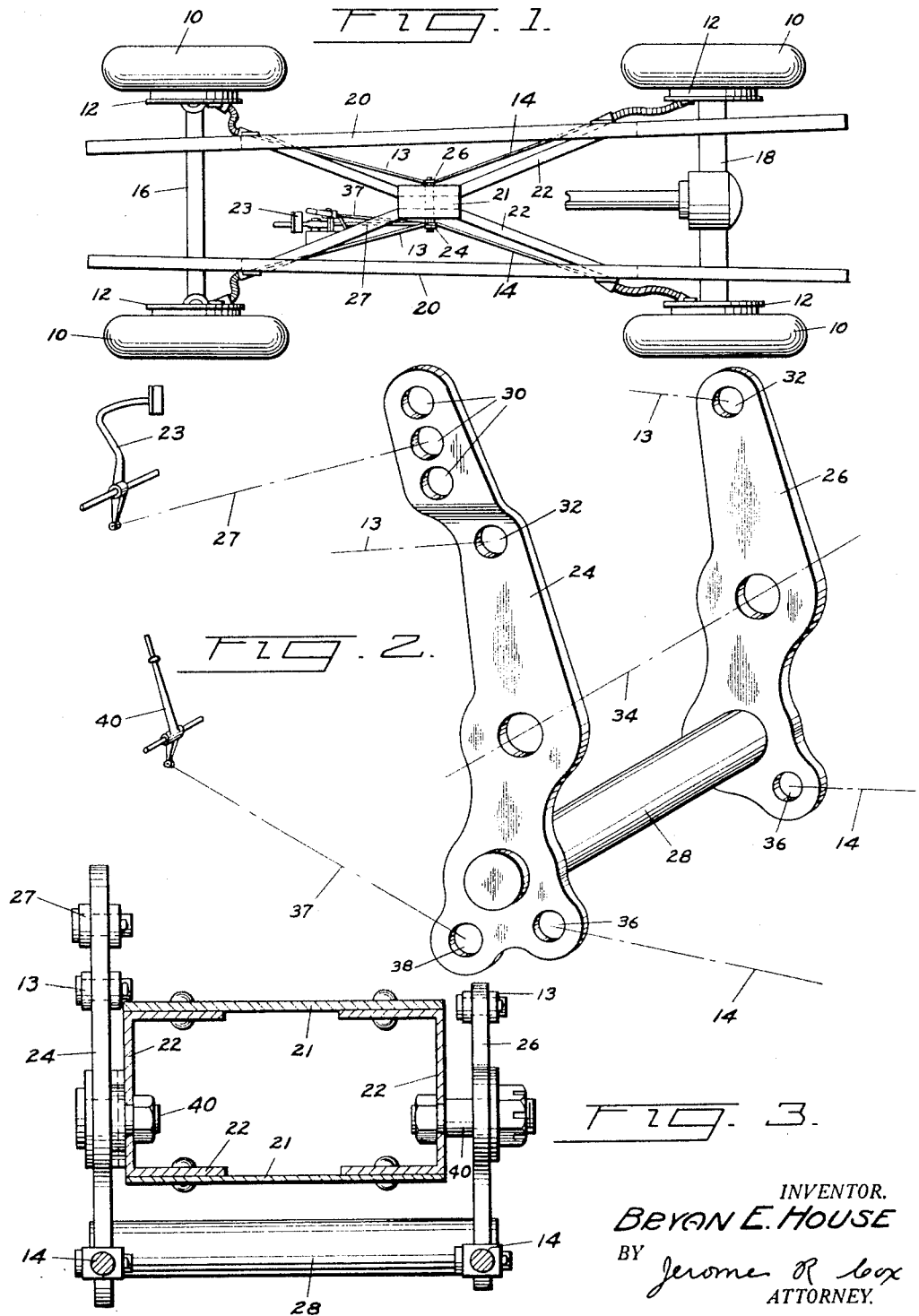
INVENTOR.
BRYAN E. HOUSE
BY Jerome R Cox
    ATTORNEY.

Feb. 25, 1936.  B. E. HOUSE  2,032,058
BRAKE
Filed Nov. 13, 1933    2 Sheets-Sheet 2
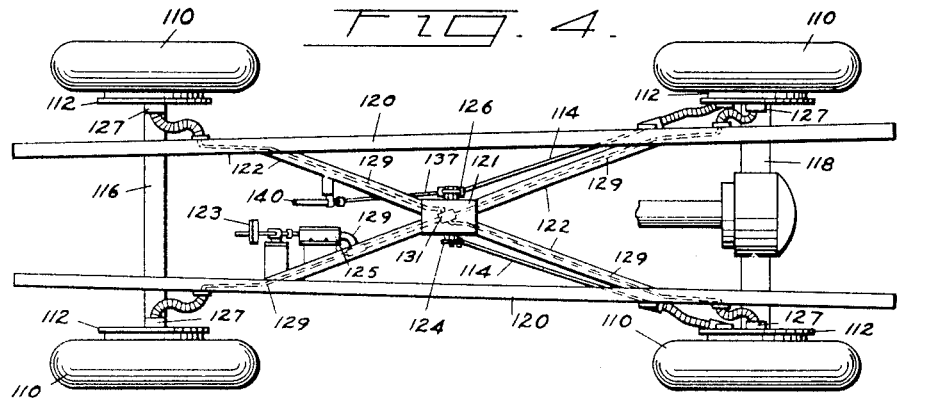
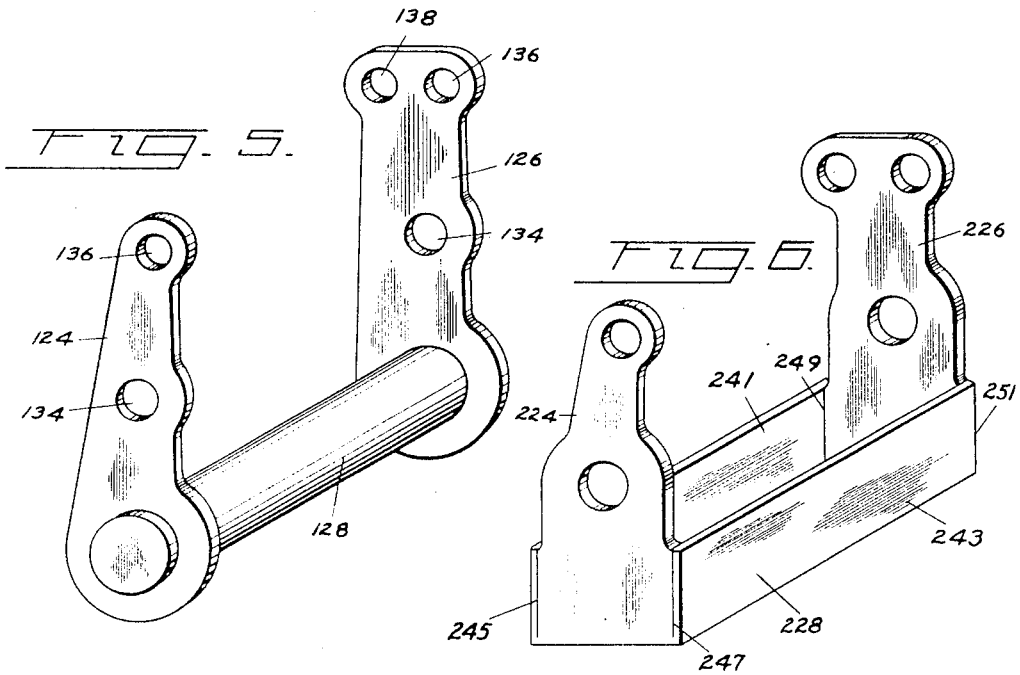
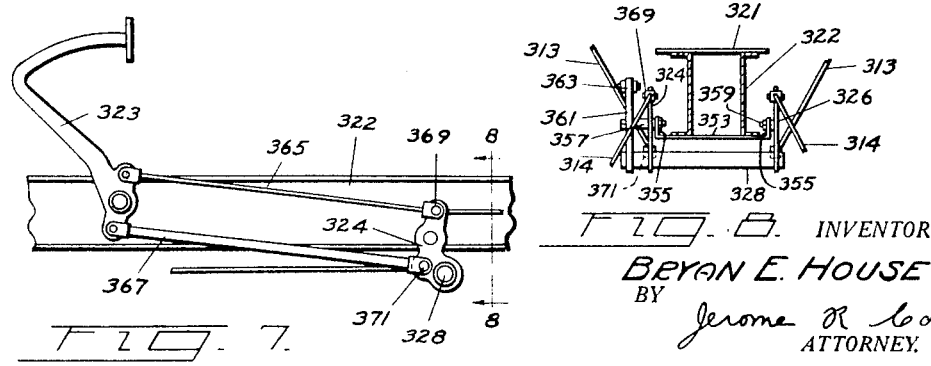
INVENTOR.
BRYAN E. HOUSE
BY Jerome R. Cox
ATTORNEY.

Patented Feb. 25, 1936

2,032,058

UNITED STATES PATENT OFFICE 2,032,058

BRAKE

Bryan E. House, South Bend, Ind., assignor to Bendix Aviation Corporation, South Bend, Ind., a corporation of Delaware Application November 13, 1933, Serial No. 697,707

12 Claims. (Cl. 188—106)

This invention relates to brakes, and particularly to a suspended cross-shaft hookup for the wheel brakes of an automobile.

One of the objects of the invention is to provide a simple, economical and efficient means for the actuation of wheel brakes.

A further object is to provide a brake hookup which can readily be mounted on substantially any type of automobile chassis without interfering with the propeller shaft or any of the fixed elements of the said chassis, and one which is especially adapted to the X-frame type of automobile construction.

Having these objects in mind, one of the principal features of this invention is a suspended cross shaft which is so mounted that it has bodily movement in addition to its turning movement and is supported by the actuating levers which are connected to the brakes. The levers may be stampings and fastened to the cross shaft, which may be solid or hollow tubing, by welding, riveting, or in any manner desired so long as a rigid connection is assured.

These and many other advantageous features and objects of this invention will be apparent from the following description taken in connection with the appended drawings, in which:

Figure 1 is a top plan view of a suspended cross shaft hookup as mounted on an automobile chassis;

Figure 2 is an enlarged perspective view of the suspended cross shaft and its associated parts;

Figure 3 is a rear elevation of the same;

Figure 4 is a top plan view of a similar hookup, as applied to an hydraulic brake system;

Figure 5 is an enlarged perspective view of the cross shaft of Figure 4 with its associated parts;

Figure 6 is a perspective view similar to Figure 5, and showing a modification;

Figure 7 is a view in section of a portion of an automobile chassis, showing a compound tension and compression unit for actuating the brake hookup, and Figure 8 is an enlarged sectional view taken on the line 8—8 of Figure 7.

The illustrated chassis shown in Figure 1 includes road wheels 10, having brakes 12 and operated by the tension members or cables 13 and 14. The wheels support front and rear axles 16 and 18, and the axles support the side rails 20 of the chassis frame. The frame may be of any desired construction, but preferably is, as shown, of X-frame design. The frame also includes diagonal members 22, which extend longitudinally of the frame. The members extend substantially parallel adjacent to their central portions, but forward and rearward thereof are turned diagonally outward. In the central portion they are secured to each other by two gusset plates 21, one secured above the members 22 and one secured below them. Two levers 24 and 26 (Fig. 2) are pivoted on the rails 22. The levers support the cross shaft 28 and also serve as levers for transmitting brake applying force to and from the cross shaft. These levers can be made of stampings of suitable dimensions to give the required strength. The lever 24 is connected through a compression member 27 to the foot pedal and a plurality of holes 30 may be drilled in the upper end of the lever to permit the member 27 to be adjustably connected thereto.

The front brakes are actuated by means of the cables 13 which are connected to the levers 24 and 26 as at 32. The rear brakes are actuated by the cables 14, which are connected to the levers 24 and 26 as at 36. The hand brake lever 40 actuates the brakes through a tension member 37, which is connected to lever 24 as at 38. In this manner it is possible to apply the brakes of all four wheels either by the use of a foot pedal or by the use of the hand lever.

The axis of rotation 34 is so located with respect to the length of the levers 24 and 26 as to give the desired distribution of force between the front and rear brakes. At least as great braking force may be applied by means of the hand lever as by means of the foot pedal, due to the arrangement of leverages.

It will be noted that the cross shaft 28 is secured to the levers 24 and 26 some distance below the axis 34, so that it is slung quite low and will clear the propeller shaft and other obstacles which would otherwise interfere with its operation. Nevertheless, the cross shaft forms a rigid connection for transmitting force to the lever 26 and its associated cables 13 and 14. I have found that even if the lever 24 should be cut between the axis 34 and the shaft 28, operation of the hand lever 40 applies the right front and both rear brakes. Tension on the cable 37 first tightens the cable 14 and applies the left rear brake. Further application of force rotates the lower portion of the lever about the point 36 as a pivot. The rotation, together with the forward movement of this portion of the lever, is transmitted through the shaft 28 to the lever 26, which thus exerts tension on the associated cables 13 and 14 to apply the right-hand brakes.

In the normal operation of the brakes, operation of the foot pedal 23 exerts a compressive force on the member 27 which is applied to the lever 24 at 30. This rotates the lever 24 (clockwise, as shown in Figure 2) and thus exerts tension on the cables 13 and 14 associated therewith to apply the left brakes. The movement of the lever 24 also rotates and translates the shaft 28 and causes a rotation of the lever 26 corresponding to that of the lever 24. This tensions the cables 13 and 14 associated therewith and thus applies the right brakes.

In the modification shown in Figure 4, wheels 110 provided with brakes 112 support axles 116 and 118 which, in turn, support the frame comprising the side rails 120 and the diagonal rails 122.

The brakes at all four wheels are usually operated by a hydraulic system of transmitting force from the pedal 123 to the brakes. This system includes a master cylinder 125, wheel cylinders 127 and conduits 129. Between the gusset plates 121 there is provided a union 131 by which the conduits 129 are all connected to each other. The rails 122 also extend between the gusset plates 121 and are secured thereto in a manner similar to that shown in Figure 3. Pivoted onto the central portion of the rails 122 are levers 124 and 126 connected to each other by a cross shaft 128. The levers 124 and 126 are provided with holes 134, by means of which they are pivotally mounted on the central portion of the rails 122. They are also provided with holes 136, to which there are secured cables 114 extending to the rear brakes, for actuating said rear brakes. The lever 126 is provided with an opening 138 to which is connected a tension element or cable 137 leading to the lower end of a hand brake lever 140.

In Figure 6 is shown a modified form of the lever and cross shaft structure similar to that shown in Figure 5. Therein both of the levers and also the connecting element are formed of a single stamping. The end portions forming levers 224 and 226 are bent at right angles to the central portion 228, and the sides 241 and 243 are also bent up at right angles and welded to the lever portions as at 245, 247, 249, and 251.

In the operation of the forms of my invention illustrated in Figures 4, 5, and 6, the brakes are normally applied through a hydraulic system by means of pedal 123. The hand brakes are applied by actuation of the hand lever 140, which acts through the cable 137 to rotate the levers 124 and 126, thus tensioning the cables 114 and applying the brakes mechanically.

In the form of my invention illustrated in Figures 7 and 8, the diagonal rails 322 are secured to each other and reinforced by the gusset plates 321 and 353. The plate 353 is provided with upturned ears 355, on which they have pivotally mounted by means of bolts 357 and 359, levers 324, 326, and 361. These levers are all connected by the suspended cross shaft 328, and are adapted to be actuated either by a hand lever (not shown) connected to the upper end of lever 361 as at 363, or by the foot pedal 323 connected by compression and tension rods 365 and 367 to the upper end 369 and the lower end 371 respectively of the lever 324. Also connected to the upper end 369 of the lever 324 is a cable 314 extending to one of the rear brakes and connected to the lower end 371 is a cable 313 extending to one of the forward brakes. Similarly, there are cables 313 and 314 connected to the lower and upper ends respectively of the lever 326.

The operation of this form of my invention is the same as the operation described above in connection with the modification shown in Figures 1–3 inclusive, except that the connections between the pedal and the lever 324 eliminate bending loads on the shaft 328, and transmit thereto substantially pure torque.

It is to be understood that the above described embodiments of my invention are for the purpose of illustration only and various changes may be made therein without departing from the spirit and scope of the invention.

I claim:

1. In an automotive vehicle having four wheels equipped with brakes, an X-frame including diagonal members, means including a foot pedal and a hand lever to apply the brakes, brake levers pivoted on said diagonal members, connecting means between the foot pedal and the hand lever and opposite ends of one of said levers, and means to vary the effective lever arm of one of said connecting means.

2. In an automotive vehicle having brakes, an X-frame including diagonal members, separate manually operable means to apply the brakes, brake levers pivoted on said diagonal members, and a cross shaft supported by said levers and positioned below said diagonal members, and connecting means between each of said manually operable means and opposite ends of one of said levers.

3. In an automotive vehicle, an X-frame including a pair of longitudinal members, each having a central portion extending substantially longitudinally of the vehicle parallel to each other and each having diagonal portions extending from its central portion toward the front and one side of the vehicle and toward the rear and one side of the vehicle, and brake levers pivoted on said central portions, and separate manually operable means operably connected to opposite ends of one of said brake levers.

4. In an automotive vehicle having four wheel brakes, an X-frame including a pair of longitudinal members, each having a central portion extending substantially longitudinally of the vehicle and each having diagonal portions extending from said central portion toward the front and one side of the vehicle, and toward the rear and one side of the vehicle, brake levers pivoted on said central portion, manual means including a foot pedal and a hand lever to apply the brakes, a cross shaft carried by said levers below said longitudinal members, and connecting means between opposite ends of one of the brake levers and the foot pedal and hand lever.

5. In an automotive vehicle having four wheels equipped with brakes, an X-frame including a pair of longitudinal members, each having a central portion extending substantially longitudinally of the vehicle and each having diagonal portions extending from said central portion toward the front and one side of the vehicle and toward the rear and one side of the vehicle, brake levers pivoted on said central portion, manual means including a foot pedal and a hand lever to apply the brakes, a cross shaft carried by said levers below said longitudinal members, a pair of plates secured to said central portions of the longitudinal members, and connecting means between opposite ends of one of the brake levers and the foot pedal and hand lever.

6. In an automotive vehicle, a frame, a pair of brake levers pivoted on said frame, actuating members for said brake levers including a hand lever and foot pedal, a connection from said hand lever to one end of one of said levers, a connection from said foot pedal to an end of one of said levers on the opposite side of the pivots from the hand lever connection, and brake operating tension elements connected to said levers, one of which extends in the opposite direction to and is only slightly offset from alignment with one of said connections.

7. In an automotive vehicle, a frame, a pair of brake levers, actuating members for said brake levers including a hand lever and a foot pedal, a connection from said hand lever to one end of one of said brake levers, a connection from said foot pedal to the opposite end of last said named lever, brake operating tension elements for a pair of brakes connected to opposite ends of said last named lever, one of which extends in the opposite direction to and is only slightly offset from alignment with one of said connections, means for pivotally mounting said brake levers on said frame so that their pivots are substantially aligned, means connected to the other brake lever for operating a second pair of brakes, and a cross shaft suspended below said aligned pivots and secured to both of said brake levers.

8. In an automotive vehicle, a frame, a pair of brake levers, brake operating tension elements for a pair of brakes connected to opposite ends of one of said brake levers, means for pivotally mounting said brake levers on said frame so that their pivots are substantially aligned, means connected to the other brake lever for operating a second pair of brakes, a cross shaft suspended below said aligned pivots and secured to both of said brake levers, and a pair of combined tension and compression connections to one of said levers connected one above the pivotal mounting and one below the pivotal mounting.

9. A brake actuating device for a vehicle having a chassis including parallel longitudinally extending side members, a frame intermediate the side members, and diagonal reinforcing members extending between opposite corners of the frame and the side members, actuating levers pivotally mounted on the framework, a cross shaft connecting said actuating levers, separate manually operable means to apply the brakes, and connecting means between opposite ends of one of said actuating levers and each of the separate manually operable means.

10. In a brake actuating device for a vehicle having a chassis including parallel longitudinally extending side members, a frame intermediate the side members, and diagonal reinforcing members extending between opposite corners of the frame and the side members, actuating levers pivotally mounted on the framework, a cross shaft suspended below the frame and connecting said actuating levers, separate manually operable means including a foot pedal and a hand lever to apply the brakes, and connecting means between opposite ends of one of the actuating levers and said hand lever and foot pedal.

11. An automotive vehicle having four wheels equipped with brakes, means including a hand lever and a foot pedal to actuate the brakes, a chassis having parallel longitudinally extending side members, a frame positioned substantially midway between the side members and intermediate the ends of the side members, diagonal members extending between opposite corners of the frame and the side members, actuating levers pivotally mounted on the frame, a cross shaft suspended below the frame and connecting said actuating levers, and separate connecting means between opposite ends of one of the actuating levers and said hand lever and foot pedal.

12. In a vehicle having brakes, separate manually operable means to apply the brakes, a chassis having parallel longitudinally extending side members, a frame positioned substantially midway between the side members and intermediate the ends of the side members, diagonal members extending between opposite corners of the frame and the side members, actuating levers pivotally mounted on the frame, a cross shaft connecting said actuating levers, separate connecting means between opposite ends of one of the actuating levers and said hand lever and foot pedal, and adjustable means to vary the effective lever arm of one of said separate manually operable means to apply the brakes.

BRYAN E. HOUSE.